H. C. MAISE.
AUTOMOBILE BODY.
APPLICATION FILED FEB. 28, 1917.
1,367,197.
Patented Feb. 1, 1921.
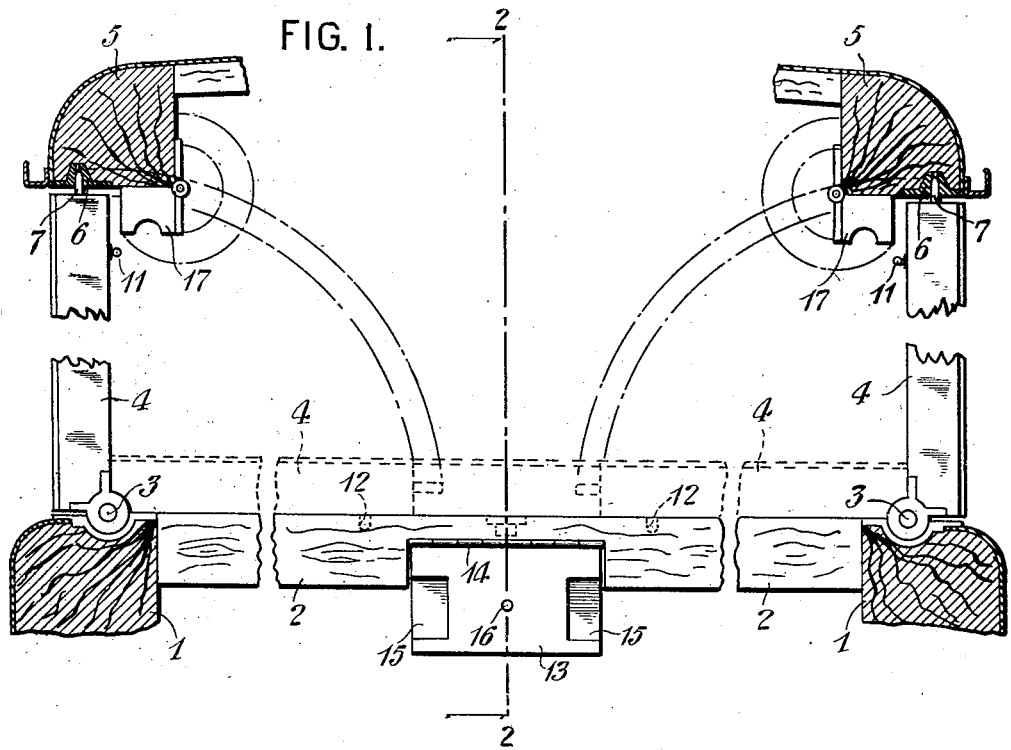
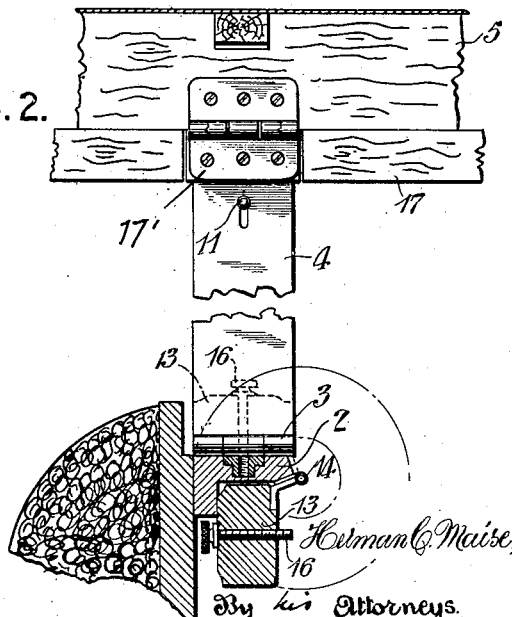

H. C. MAISE.
AUTOMOBILE BODY.
APPLICATION FILED FEB. 28, 1917.
1,367,197.
Patented Feb. 1, 1921.
2 SHEETS—SHEET 2.
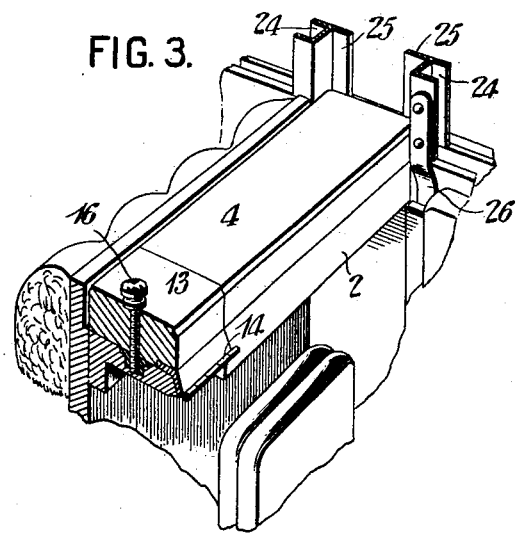
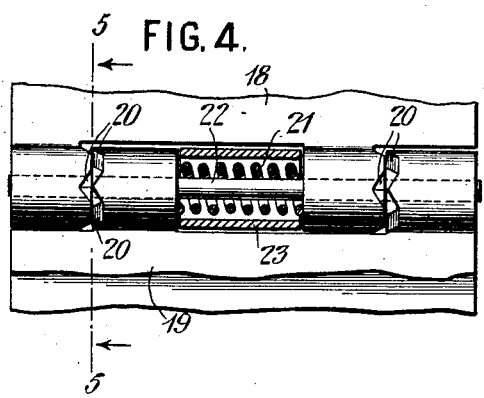
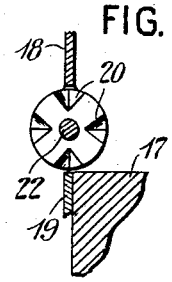
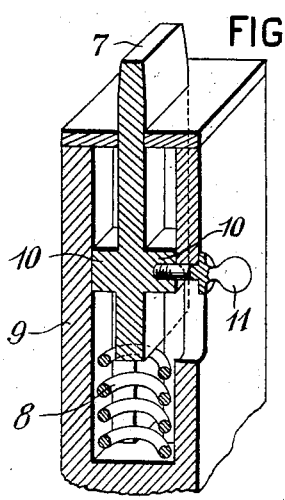
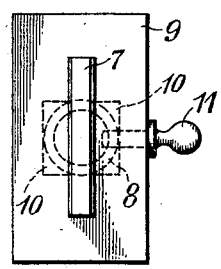
Herman C. Maise, Inventor;
By his Attorneys

UNITED STATES PATENT OFFICE.

HERMAN C. MAISE, OF DETROIT, MICHIGAN, ASSIGNOR, BY MESNE ASSIGNMENTS, TO EDWARD G. BUDD MANUFACTURING COMPANY, A CORPORATION OF PENNSYLVANIA.

AUTOMOBILE-BODY.

1,367,197.  Specification of Letters Patent.  Patented Feb. 1, 1921.

Application filed February 28, 1917. Serial No. 151,389.

*To all whom it may concern:*

Be it known that I, HERMAN C. MAISE, a citizen of the United States, a resident of the city of Detroit, county of Wayne, State of Michigan, have invented an Improvement in Automobile-Bodies, of which the following is a specification.

My invention relates to convertible automobile bodies, that is bodies which may be closed to afford protection from the weather, or more or less completely opened, and is more particularly designed for use in connection with the well-known "Springfield type" body, which comprises a standing roof and is provided with windows or other side inclosing members, which may be folded or completely removed in order to open the sides of the body.

My invention is designed to provide removable side members of such character that they may be removed or folded down with the greatest possible ease, and when so removed or folded down present a neat and finished appearance, and are rigidly held to prevent rattling. The removable side members of my invention are also of such character that they coöperate to produce a weather tight closure of the sides of the body and are so designed and attached to the body as to permit of the slight relative movement of the various parts of the body known to body builders as weaving.

Other objects and advantages of my improved construction will appear in the specification and the claims hereto appended.

In the drawings, Figure 1 is a back view of the front seat of an automobile body, embodying my improvements; Fig. 2 is a sectional side view thereof taken on the line 2—2 of Fig. 1; Fig. 3 is a perspective view of one half of the front seat; Fig. 4 is a detail view partly in section of the spring hinge used for a portion of the window stop of my improved body; Fig. 5 is a sectional view taken on the line 5—5 of Fig. 4; Fig. 6 is a perspective view partly in section showing the fastening means of one of the side sections of my improved body and Fig. 7 is a plan view of the fastening means shown in Fig. 6.

In the drawings, 1 indicates the arm rails of the body, which extend along either side and which may be connected by means of the cross rail 2, of the front seat. Hinged to the arm rail 1, by means of hinges 3, are posts 4 which extend between the arm rail 1 and the top rail 5. The lower edge of the top rail 5 has mounted upon it the casting 6 which has a depression formed in it to take the bolt 7. I prefer to slightly bevel the end of the bolt and to make the depression in the casting to correspond to this shape in order to prevent movement of the bolt in the depression.

The bolt 7 (see Fig. 6) is spring pressed into the depression in the casting 6 by means of spring 8, which is contained in the housing 9, which also forms the guides for the bolt, the bolt being provided with lateral extensions 10 to contact with the sides of the housing. Attached to one of the lateral extensions 10 is a button 11 or other suitable actuating means whereby the bolt may be retracted against the tension of the spring 8 to release the post 4 from its engagement with the top rail 5, but the parts are so proportioned that a slight clearance is left between the upper end of the post 4 and the casting 6, attached to the top rail 5, and when the bolt is in operative engagement with the casting 6, pressure is constantly exerted by the spring 8. This forms a connection, permitting the weaving of the body, any slight variations in vertical dimensions being taken up by the spring 8 and any slight lateral movement of the body parts with respect to one another being taken up by the hinge 3.

The posts 4 may be folded down inwardly to lie flat upon the top rail 2 of the front seat, which is recessed as at 12 to accommodate the knob or handle 11. In order to hold the posts against movement to prevent rattling and to produce a finished appearance when the posts are folded down, I provide a block 13 hingedly connected by means of hinge 14 to the top rail 2 of the back seat, and provided with recesses 15 to take the spring bolts 7. Block 13 is shown in Figs. 1 and 2 in its inoperative position, that is the position it occupies when the posts 4 are in vertical position and is shown in Fig. 3 in its operative position, that is, the position occupied by it when the posts are folded down. To hold the block 13 in position, the thumb screw 16, or other suitable means may be provided. By making the leaves of the hinge 14 in the shape illustrated in the drawings, I am enabled to throw the block 13 into a recess under the top rail 2 of the front seat, and thus effectively conceal it when it is in the inoperative position.

Attached to the lower edge of the top rail 5, is a window stop 17, which may extend the entire length of the side opening. Immediately opposite the posts 4 I provide a hinged section 17' of the window stop, so that the posts may be moved inwardly and so that when the posts are erected, the continuity of the stop will not be disturbed. The hinges preferably used for this purpose, are illustrated in Figs. 4 and 5 and comprise two butts, 18 and 19, provided with coöperating cam surfaces 20. The cam surfaces are held in engagement by means of spring 21, which surrounds the pintle 22 of the hinge, and is effectively protected and concealed by a sleeve 23. When one of the parts is moved relatively to the other, the spring 21 is compressed, when the cam surfaces 20 ride up upon one another, and the hinge is therefore held with the cam surfaces in engagement, either in the position shown in Fig. 1, or in an upwardly folded position in which the stop will escape the post 4 when moved.

I prefer to use, in connection with the folding post described above, window guides of the form illustrated in Fig. 3, for guiding the windows that are lowered into recesses in the doors when not in use. These window guides comprise a channel portion 24, within which the window is adapted to slide, and a flange 25 which extends slightly over the post when erected, in order to cover the joint between the post and the adjacent window. These window guides may be fixed in position, although I prefer to fold them down upon hinges 26 when not in use, so that they will occupy a position at the inside of the door, and be completely out of sight. By the use of such window guides, it is possible to secure adequate guiding for the windows, together with complete protection of the joints between the posts and the adjacent windows, and an entire removal of all vertical members between the top and the body arm rail, without actually detaching the hinged members.

The embodiment of my invention illustrated and described, is intended to be typical of the use of my invention in an automobile body, and to represent a construction which I have successfully manufactured and operated, but I do not intend to confine myself to the particular modification shown and described, since it will be evident to those skilled in the art that many changes may be made without departing from the spirit of my invention.

What I claim is:

1. An automobile body, comprising a top rail, a window stop carried by the top rail at its underside, an arm rail, a side member hingedly connected to the arm rail and adapted to be swung about its hinge at right angles to the window stop, a section of the window stop opposite the side member being hinged to permit it to be moved out of the path of movement of the side member.

2. An automobile body comprising a top rail, a sectional window stop secured thereto, one section of the stop being fixed and another movable, a hinge connecting the movable section to the rail and means for holding the movable section in a plurality of positions.

3. An automobile body, comprising a top rail, a sectional window stop secured thereto, one section being fixed and another movable, a hinge connecting the movable section with the rail, said hinge comprising a pair of butts having coöperating cam surfaces and a spring tending to force said surfaces into engagement.

4. An automobile body, comprising a pair of arm rails, a cross rail connecting the arm rails, a pair of side members hinged upon the side rails and adapted to be swung downwardly upon the cross rail and a filler block, hingedly connected to the cross rail and adapted to be swung from a position underneath the cross rail to a position of engagement with the side members.

5. An automobile body comprising a cross rail, a pair of hingedly mounted posts, each carrying a projection at its free end adapted to be swung downwardly upon the cross rail, a recessed block adapted to engage said projections hingedly connected to the cross rail and adapted to be swung from a position underneath the cross rail to a position above it and means for holding said block in position.

6. An automobile body, comprising a side rail, a post hingedly connected thereto and adapted to be raised into a vertical position, a door adjacent the post and having a recess, a metallic window member hingedly connected to the door and adapted to be swung into a vertical position above it, said window member having a channel portion to guide the window which occupies a position directly above the recess in the door, when in a vertical position and a flange adapted to overlap the side member, when the side member is in a vertical position.

In testimony whereof, I have signed my name to this specification this 14th day of February 1917.

HERMAN C. MAISE.